(12) United States Patent
Forsberg

(10) Patent No.: US 8,737,271 B2
(45) Date of Patent: May 27, 2014

(54) GRAPHICAL USER-INTERFACE FOR TERMINALS WITH VISUAL CALL PROGRESS INDICATOR

(75) Inventor: Mikael Forsberg, Tyresö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/322,562

(22) PCT Filed: Jun. 1, 2009

(86) PCT No.: PCT/EP2009/056702
§ 371 (c)(1),
(2), (4) Date: Nov. 27, 2011

(87) PCT Pub. No.: WO2010/139356
PCT Pub. Date: Dec. 9, 2010

(65) Prior Publication Data
US 2012/0069775 A1    Mar. 22, 2012

(51) Int. Cl.
*H04W 4/16* (2009.01)
(52) U.S. Cl.
USPC .......................................................... 370/259
(58) Field of Classification Search
USPC .................. 370/389, 352, 394; 709/221, 242; 455/412.1; 714/46; 379/201.01
See application file for complete search history.

(56) References Cited

U.S. PATENT DOCUMENTS 5,557,658 A     9/1996  Gregorek et al.
6,145,101 A  *  11/2000 Pike ................................ 714/46

(Continued)

FOREIGN PATENT DOCUMENTS

CN    101047628 A    10/2007
CN    101405713 A    4/2009

(Continued)

OTHER PUBLICATIONS

Mojtaba Yaghoubi Waskasi1 , Mansour Sadeghi1 , Mansour Mirzabaghi2, Yazdan Nasr Harandi2, Abbas Iravani Tabrizipoor3, Mahmoud Pirhadil, "NGN Test Strategy: Evaluating Next Generation Networks in a Realistic Environment",2008.*

(Continued)

*Primary Examiner* — Asad Nawaz
*Assistant Examiner* — Parth Patel
(74) *Attorney, Agent, or Firm* — Potomac Patent Group PLLC

(57) ABSTRACT

In one aspect, a user terminal is configured to access an IMS network, and to obtain from the network an indication of a current dial-tone condition of the terminal. The terminal displays a graphical user-interface, GUI, that includes a visual indication of the current dial-tone condition of the terminal. In another aspect Application Server function in an IMS network is configured to provide information to a user terminal regarding a current dial-tone condition such that the user terminal is able to display an indication of the current dial-tone also known as call progress tone. Examples given in the application are dial-tone aka ring-back tone, message waiting tone and tones indicating that the user has activated call forwarding unconditional or call diversion. In another aspect a method of enabling a user of a user terminal accessing an IMS network to be informed of a current dial-tone condition of the user terminal includes: providing the user terminal with information regarding the current dial-tone condition; and, based on the obtained information, displaying the current dial-tone condition on a graphical user-interface on the user terminal.

13 Claims, 5 Drawing Sheets

(56) References Cited

U.S. PATENT DOCUMENTS

| | | | |
|---|---|---|---|
| 6,249,812 B1* | 6/2001 | Cromer et al. | 709/221 |
| 6,345,047 B1* | 2/2002 | Regnier | 370/352 |
| 6,766,162 B1* | 7/2004 | Beamish | 455/412.1 |
| 6,961,754 B2* | 11/2005 | Christopoulos et al. | 709/204 |
| 7,706,325 B2* | 4/2010 | Fodor et al. | 370/331 |
| 7,990,960 B2* | 8/2011 | Bakker et al. | 370/389 |
| 2002/0059638 A1* | 5/2002 | Oz et al. | 725/129 |
| 2003/0123435 A1 | 7/2003 | Yeom et al. | |
| 2005/0002400 A1* | 1/2005 | Karol et al. | 370/394 |
| 2007/0201658 A1* | 8/2007 | Lin et al. | 379/201.01 |
| 2007/0253336 A1 | 11/2007 | Martinez | |
| 2009/0024760 A1* | 1/2009 | Saha et al. | 709/242 |
| 2009/0204711 A1* | 8/2009 | Binyamin | 709/226 |
| 2010/0046499 A1* | 2/2010 | Hu et al. | 370/352 |

FOREIGN PATENT DOCUMENTS

| | | | |
|---|---|---|---|
| CN | 101421976 A | | 4/2009 |
| JP | 06-054063 A | | 2/1994 |
| JP | 07-058841 A | | 3/1995 |
| JP | 10-190847 A | | 7/1998 |
| JP | 2000078227 A | * | 3/2000 ............... H04L 29/06 |
| JP | 2000-101744 A | | 4/2000 |
| JP | 2003-219444 A | | 7/2003 |
| JP | 2006-352339 A | | 12/2006 |
| JP | 2009-502071 A | | 1/2009 |
| JP | 2009-528789 A | | 8/2009 |
| WO | 2005/055576 A2 | | 6/2005 |
| WO | 2007/098286 A2 | | 8/2007 |
| WO | WO 2007/098286 A2 | * | 8/2007 |
| WO | 2009/049664 A1 | | 4/2009 |

OTHER PUBLICATIONS

PCT International Search Report, mailed Mar. 4, 2010, in connection with counterpart International Application No. PCT/EP2009/1056702.

PCT Written Opinion, mailed Mar. 4, 2010, in connection with counterpart International Application No. PCT/EP2009/1056702.

International Preliminary Report on Patentability, mailed Sep. 16, 2011, in connection with counterpart International Application No. PCT/EP2009/1056702.

"5ESS Switch Announcement-Based Services" IBM Technical Disclosure Bulletin, International Business Machines Corp. (Thornwood), US, vol. 38, No. 4, Apr. 1, 1995, p. 303, XP00516160, ISSN: 0018-8689.

Siemens "System Hicom 300" V3.4, A30951-A1000-V340-1-18, Nov. 1995.

ETSI Technical Specification 183 043, V2.3.1, Telecommunications and Internet converged Services and Protocols for Advanced Networking (TISPAN); IMS-based PSTN/ISDN Emulation; Stage 3 specification, Mar. 2009.

ETSI Technical Specification 183 023 V2.0.0, Telecommunications and Internet converged Services and Protocols for Advanced Networking (TISPAN); PSTN/ISDN simulation services; Extensible Markup Language (XML) Configuration Access Protocol (XCAP) over the Ut interface for Manipulating NGN PSTN/ISDN Simulation Services, Jun. 2008.

3GPP Technical Specification 24.604 V8.3.0, Technical Specification Group Core Network and Terminals; Communication Diversion (CDIV) using Ip Multimedia (IM) Core Network (CN) subsystem; Protocol specification (Release 8), Mar. 2009.

Japanese Office Action, mailed May 7, 2013, in connection with counterpart Japanese Patent Application No. 2012-512217 (all pages).

Translation of Japanese Office Action, mailed May 7, 2013, in connection with counterpart Japanese Patent Application No. 2012-512217 (all pages).

Chinese Office Action, dated May 17, 2013, in connection with counterpart Chinese Application No. 200980159695.5, all pages.

Translation of Chinese Office Action, dated May 17, 2003, in connection with counterpart Chinese Application No. 200980159695.5, all pages.

Chinese Search Report, dated Feb. 21, 2013, in connection with counterpart Chinese Application No. 200980159695.5, all pages.

Translation of Chinese Search Report, dated Feb. 21, 2013, in connection with counterpart Chinese Application No. 200980159695.5, all pages.

EP 94(3) Communication, dated Jan. 21, 2014, in connection with European Patent Application No. 09 779 603.1-1858, all pages.

\* cited by examiner

GRAPHICAL USER-INTERFACE FOR TERMINALS WITH VISUAL CALL PROGRESS INDICATOR

TECHNICAL FIELD

The present invention relates to a graphical user-interface that includes dial tone information for user terminals in a mobile telecommunications environment.

BACKGROUND

Telephone systems make use of dial tones to inform the telephone user about certain conditions that persist. For example a "normal" dial tone indicates that the telephone is connected and the user can make a call, while alternative dial tones may include, for example, a "message waiting" dial-tone indicating that the user has a new voice-mail message waiting to be listened to, or other "special" dial-tones indicating other conditions that may arise from time to time. For example, a user may be able to create or activate certain special rules for forwarding calls or messages, and such may be indicated by a "special" dial-tone. The special dial tone indicates that an unconditional forwarding rule is active, i.e. no incoming calls will be presented to the terminal, as they are unconditionally forwarded, to e.g. voice mail or a third number.

In traditional analogue public switched telephone networks (PSTNs) having fixed lines, the dial tone is triggered by an appropriate electrical signal fed to the telephone. In today's IP-based telecommunications systems, for a network that replaces a PSTN the dial tone information is handled by a PSTN Emulation Subsystem (PES) (see ETSI TS 183 043 "Telecommunications and Internet Converge Services and Protocols for Advanced Networks (TISPAN); IMS based PSTN/ISDN Emulation Stage 3 specification"). However, mobile terminals do not generate a dial tone. This is because the number is dialled 'en block', so the dial tone information can not be presented to the end user as audible information. Moreover, particularly with the advent of the IP Multimedia Subsystem (IMS) developed by the $3^{rd}$ Generation Project Partnership (3GPP), the communication endpoint could be another type of user equipment (UE) terminal such as a personal computer (so-called PC clients) and PC Soft client terminals. Such terminals also do not generate a dial tone, and so networks do not currently provide dial-tone information to these user terminals. As a result the user is not made aware of the information that is conveyed in the dial tone, such as the existence of a new voice-mail message or other special conditions.

The present invention has been conceived with the above limitations in mind.

SUMMARY OF THE INVENTION

According to a first aspect of the present invention there is provided a user terminal configured to access an IMS network, and to obtain from the network an indication of a current dial-tone condition of the terminal. The terminal displays a graphical user-interface, GUI, that includes a visual indication of the current dial-tone condition of the terminal.

The current dial-tone condition displayed may be one selected from a set of dial tone conditions that includes a standard dial-tone, a special condition dial-tone, and a message-waiting dial-tone. The dial-tone condition displayed may be determined from dial-tone information provided in a PES format.

It is an advantage that the user terminal can make use the dial tone management information that is currently used in PES scenarios and present it in the form of a GUI for mobile terminals and PC soft clients. Thus, the PES functionality of Dial Tone Management is provided to mobile terminals and PC Soft clients, which are not provided with a dial tone from the network.

The dial-tone information may be provided to the user from an application server, AS. The user terminal may be configured to obtain the dial-tone information from the AS when the user registers with the IMS or when the user creates, or activates a CDIV CFU rule.

The user terminal may be configured as a Ut client, and be operable to send a request to the network to obtain the indication of the current dial-tone condition of the terminal.

According to a second aspect of the present invention there is provided an Application Server (AS) function in an IMS network configured to provide information to a user terminal accessing the IMS network regarding a current dial-tone condition such that the user terminal is able to display an indication of the current dial-tone.

The AS may be configured to provide the current dial-tone condition information to the user terminal in response to user registration with the IMS network, or in response to creation or activation of a Communication Diversion, CDIV, Communication Forward Unconditional, CFU rule by the user. The AS may be configured to provide an indication that the current dial-tone condition is normal in response to de-activation of a CDIV CFU rule by the user. The AS may be configured to determine the dial-tone condition of the user terminal by use of a PES.

According to a third aspect of the present invention there is provided a method of enabling a user of a user terminal accessing an IMS network to be informed of a current dial-tone condition of the user terminal. The method comprises: providing the user terminal with information regarding the current dial-tone condition; and, based on the obtained information, displaying the current dial-tone condition on a graphical user-interface on the user terminal.

The dial-tone condition information may be provided in a PES format. The dial-tone information may be provided to the user from an application server, AS. The current dial-tone condition information may be provided to the user terminal in response to user registration with the IMS network, or in response to creation or activation of a CDIV CFU rule by the user. The method may further comprise providing an indication that the current dial-tone condition is normal in response to de-activation of a CDIV CFU rule by the user.

Embodiments are described below with reference to a user accessing an IMS network. Signalling is described with the use of Session Initiation Protocol (SIP) messages. However, the principles described may also be applied to other mobile telecommunications networks and protocols.

Figure 1:
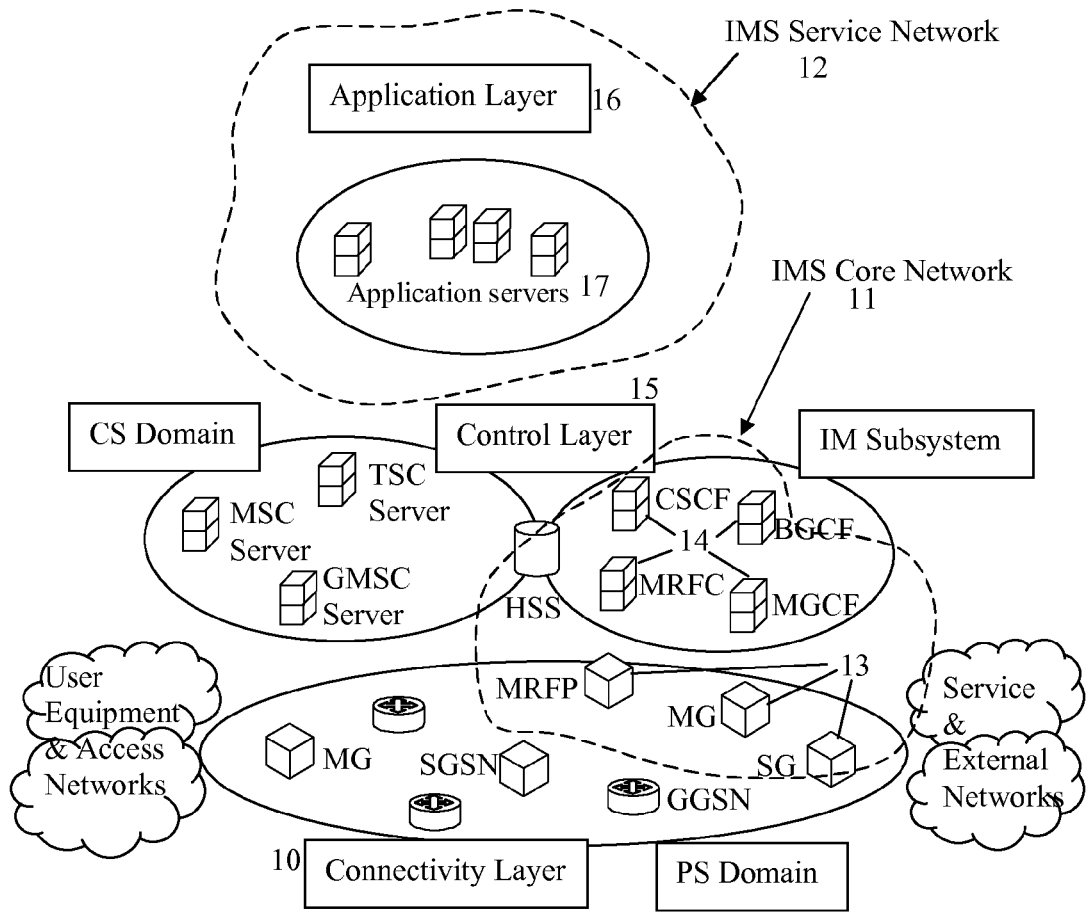
FIG. 1 is a schematic illustration showing how the IMS integrates in mobile telecommunications networks.

FIG. 1 illustrates schematically how the IMS fits into the mobile network architecture in the case of a General Packet Radio Service/packet switched GPRS/PS access network. As shown in FIG. 1 control of communications occurs at three layers. The lowest layer is the Connectivity Layer 10, through which signals are directed to/from user terminals (not shown) accessing the network. The IMS includes a core network 11 and a Service Network 12. The IMS core network 11 includes nodes 13 that send/receive signals to/from the GPRS network via the Connectivity Layer 10 and network nodes 14 that include Call/Session Control Functions (CSCFs), which operate as SIP proxies within the IMS in the middle, Control Layer 15. At the top is the Application Layer 16, which includes the IMS Service Network 12. Application Servers (ASs) 17 are provided for implementing IMS service functionality. Application Servers 17 provide services to end-users, and certain Application Servers 17 will perform actions dependent upon subscriber identities (either the called or calling subscriber, whichever is "owned" by the network controlling the Application Server).

Figure 2:
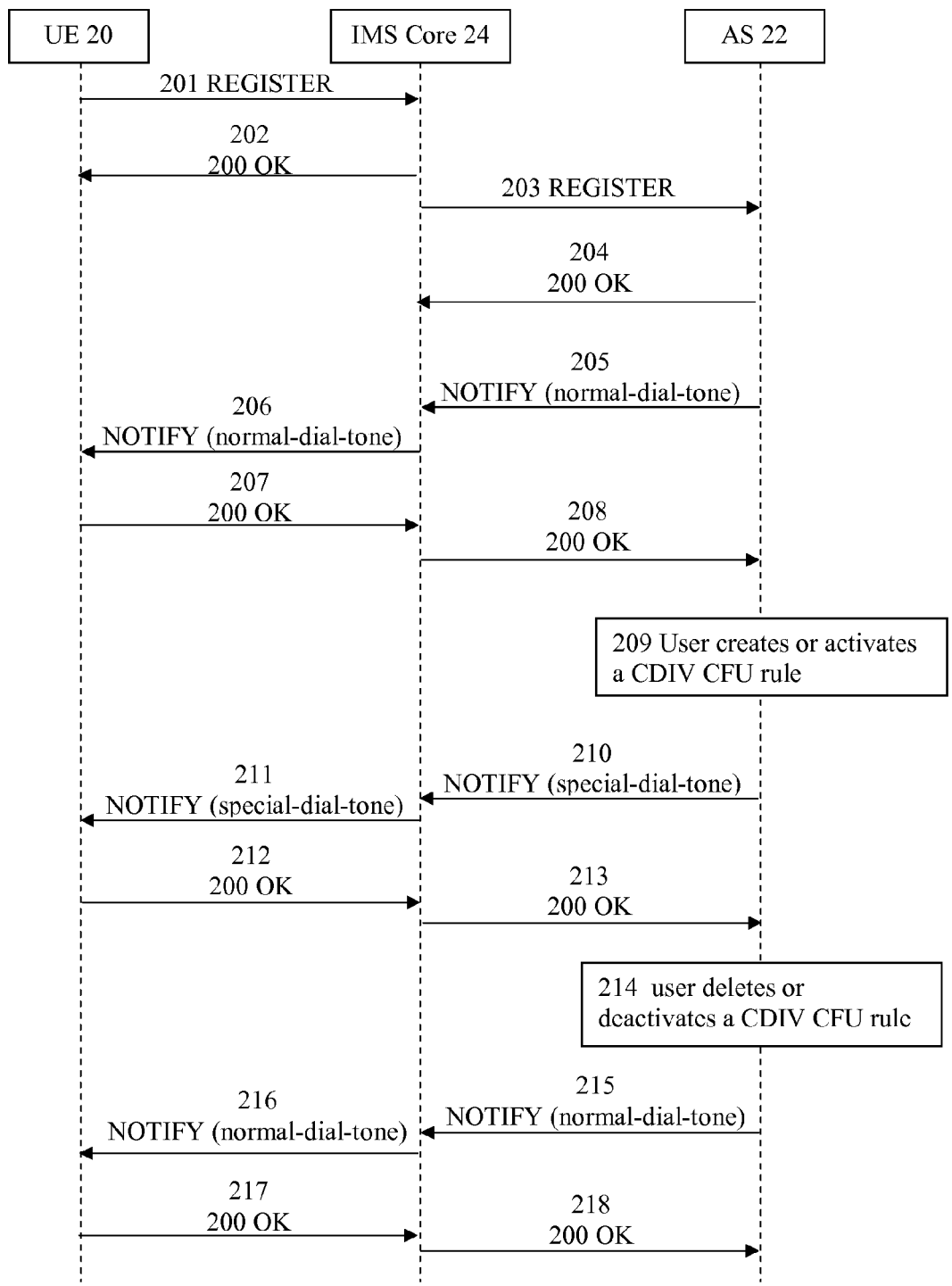
FIG. 2 is signal sequence diagram showing how dial-tone information may be provided to a user terminal.

FIG. 2 illustrates a process whereby a user equipment terminal (UE) 20 is provided with dial tone information from an application server (AS) 22 via the IMS core network 24. At step 201 the user registers the UE 20 with the IMS 24, which is completed by the return of a SIP 200 OK message at step 202. In one implementation, the user subscribes to a dial-tone management information service provided by the AS 22. In an alternative implementation the IMS network may be configured to provide unsolicited dial-tone management information to UEs. Either way, at step 203 the IMS core network 24 informs the AS that the UE 20 has registered, which is confirmed by a 200 OK message at step 204. Then, at step 205, the AS 22 sends a SIP NOTIFY message with an indication of the current dial-tone status, which in the illustrated case is a normal dial-tone. Depending on the circumstances, and the particular operational set-up of the network system, the NOTIFY message might indicate a different dial-tone status, such as a 'message waiting' or 'special' dial tone. However, dial-tone information that indicates voice mail is normally sent from the voice mail system server and this is usually different from the AS 22 that handles traffic and the dial tone indication due to CFU (Unconditional Communication Forwarding). Therefore the most likely situation will be for the dial-tone status indicated in the initial NOTIFY message at step 205 to be 'normal'.

At step 206 the NOTIFY message with dial-tone information is forwarded from the IMS core 24 to the UE 20, and at steps 207 and 208 receipt is confirmed by 200 OK messages returned to the AS 22. In an alternative implementation, not shown in FIG. 2, the AS may be configured to wait until the UE requests the provision of dial-tone information before sending the NOTIFY message.

At step 209, the user creates or activates a Communication Diversion (CDIV) Communication Forward Unconditional (CFU) rule. The manner in which this is done is not relevant to the current system or method, but this might be done, for example, by means of a webportal, Ut interface or a Supplementary Service Code (see, for example ETSI TS 183 023 "Telecommunications and Internet converged Services and Protocols for Advanced Networking (TISPAN); PSTN/ISDN simulation services; Extensible Markup Language (XML) Configuration Access Protocol (XCAP) over the Ut interface for Manipulating NGN PSTN/ISDN Simulation Services"). CDIV is a mechanism that is specified in 3GPP Technical Specification TS 24.604 "Technical Specification Group Core Network and Terminals; Communication Diversion (CDIV) using IP Multimedia (IM) Core Network (CN) subsystem; Protocol specification".

At step 210 the AS sends a new NOTIFY message indicating a "special" dial-tone, which in this case would be a dial-tone indicating that an unconditional CDIV CFU rule is active. This is forwarded to the UE 20 at step 211, and confirmed back to the AS 22 at steps 212 and 213.

Similarly, as shown at step 214, the user deletes or deactivates the CDIV CFU rule (again the means by which this is done is not important, but may be any of the means indicated above for creating or activating the rule). On this occasion, at step 215, the AS 22 sends a NOTIFY message indicating that the dial-tone status has returned to the normal dial-tone. This is forwarded to the UE 20 at step 216, and confirmed back to the AS 22 at steps 217 and 218.

Alternatively, or in addition to the above (but not shown in FIG. 2), the system may be configured to enable a UE to fetch the dial-tone information. For example, WO 2009/049664 (International patent Application No. PCT/EP2007/060973) describes an extension of the basic Ut interface. The Ut interface allows a subscriber to manipulate XML data associated with an AS and which defines how certain services are provisioned to that subscriber. Thus, the user can request provision of the current dial-tone information from the AS 22 via the Ut interface. The AS 22 will then send a NOTIFY message to the UE 20 containing the current dial-tone information. Note that, for this alternative, the UE 20 must be configured as a Ut client.

Figure 3:
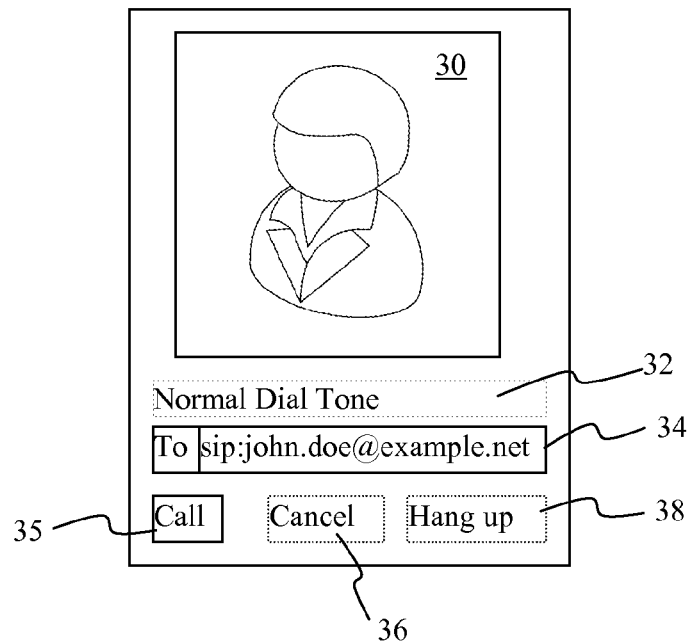
FIGS. 3 to 5 illustrate a graphical user interface displaying different dial-tone indications.
Figure 4:
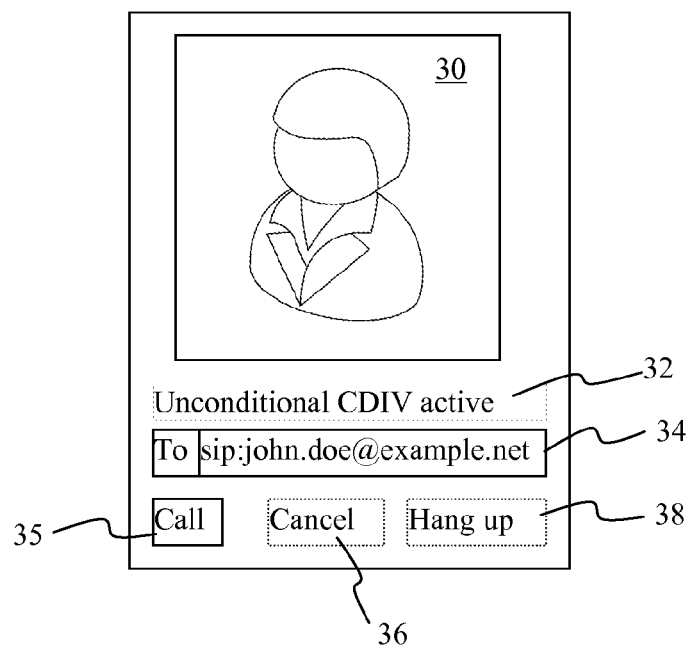
Figure 5:
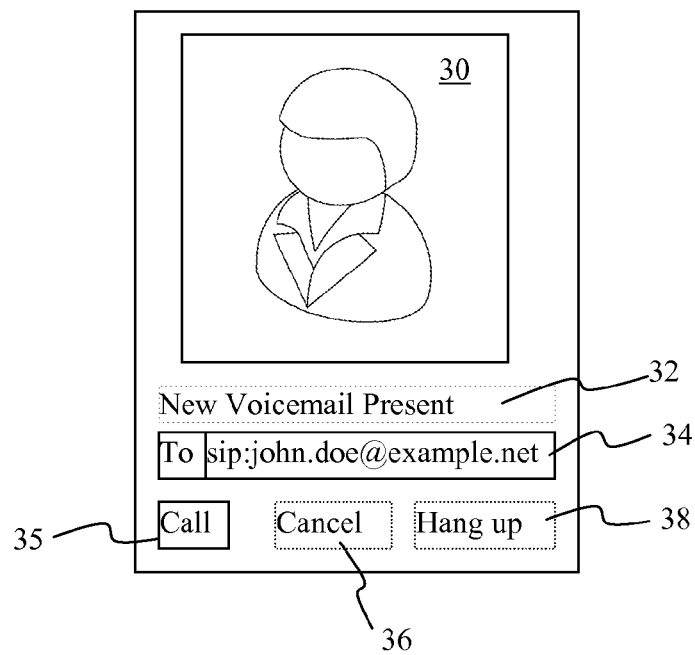

The dial-tone information contained in the NOTIFY messages sent from the AS 22 is in the format provided by the Public Switched Telephone System (PSTN) Emulation Subsystem or PES. However, mobile terminals such as Mobile phones or PC clients do not have dial tones, and may not even have any audible means (e.g. a speaker) for the user to hear a dial-tone. For this reason the UE 20 is provided with a graphical user-interface (GUI) that it displays. For example, the GUI may be a pop-up box that appears on the screen of a PC client. Examples of the GUI are shown in FIGS. 3 to 5. The GUI includes a graphical symbol 30 by which the user can instantly recognise it as the dial-tone management GUI. A dial-tone display 32 indicates the current dial-tone status of the UE, based on the information provided in the most recent NOTIFY message sent from the AS. Additional fields in the GUI include an address field 34 to indicate the address of a peer with whom the user is intending to send a message or make a call, and call 35, cancel 36 and hang-up 37 buttons that the user can activate (e.g. by clicking on using a mouse) when making the call.

As shown in FIG. 3, the dial tone status indicated in field 32 is the "normal" dial tone. Optionally, the GUI may be configured not to display a dial-tone status when the status is the normal dial-tone, as this is the default condition. As shown in FIG. 4, the dial tone status indicated in field 32 is a "special" dial tone indicating that the user has created or activated a CDIV CFU rule. As shown in FIG. 5, the dial tone status indicated in field 32 is the "message waiting" dial tone, indicating that the user has new voice mail present.

Note that the NOTIFY messages sent by the AS 22 at steps 205 and 215 are shown in FIG. 2 as normal dial-tones, which would be the usual or default dial-tone. In that case the UE 20 would display the GUI shown in FIG. 3 (or would not display the dial-tone status at all). However, it might be that the user has a voice mail message waiting to be listened to. Voice mail is usually handled by a separate server (i.e. not AS 22), and in that case the voice mail server will send a NOTIFY message containing the 'message waiting' dial tone information to the UE 20. In the event that the UE receives two such separate and conflicting NOTIFY messages each indicating a different dial tone status, then the 'message waiting' dial-tone would override the 'normal' dial-tone so that the GUI shown in FIG. 5 would be displayed. Similarly, if the user had a voice mail message waiting when the NOTIFY message at step 210 was sent (after activation of the CDIV CFU rule), then the system would be configured either for one dial-tone to over-ride another, or for it to depend on the conditions specified in the rule as to whether the application of the 'special' dial-tone should be used, or whether the 'message waiting' dial-tone should take priority.

However, it is also possible that the network could be configured for the voice-mail dial-tone information to be provided to the AS 22, and for all DTM NOTIFY messages to be sent to the UE 20 from the AS 22 (rather than the voice-mail dial-tone information being provided directly to the UE). In that case the AS 22 determines the appropriate dial-tone information to send to the UE 20.

Figure 6:
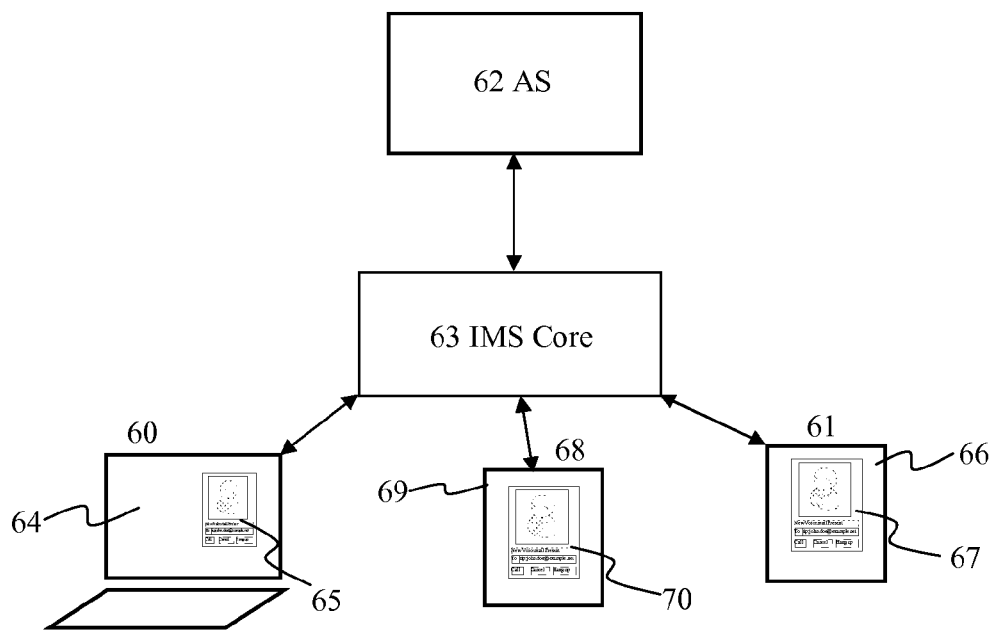
FIG. 6 is a schematic illustration showing relationships between hardware components.

FIG. 6 illustrates schematically the system hardware. As shown user terminals 60, 61 and 66 access a dial-tone information management application server 62 via the IMS core network 63. User terminal 60 is a personal computer operating as a PC client, and has a screen 64 on which is displayed a dial-tone management GUI 65, such as one of the GUIs shown in FIGS. 3 to 5. User terminal 62 is a PC-Soft terminal, having a screen 66 displaying a dial-tone management GUI 67. User terminal 68 is a Mobile terminal, having a screen 69 displaying a dial-tone management GUI 70.

Figure 7:
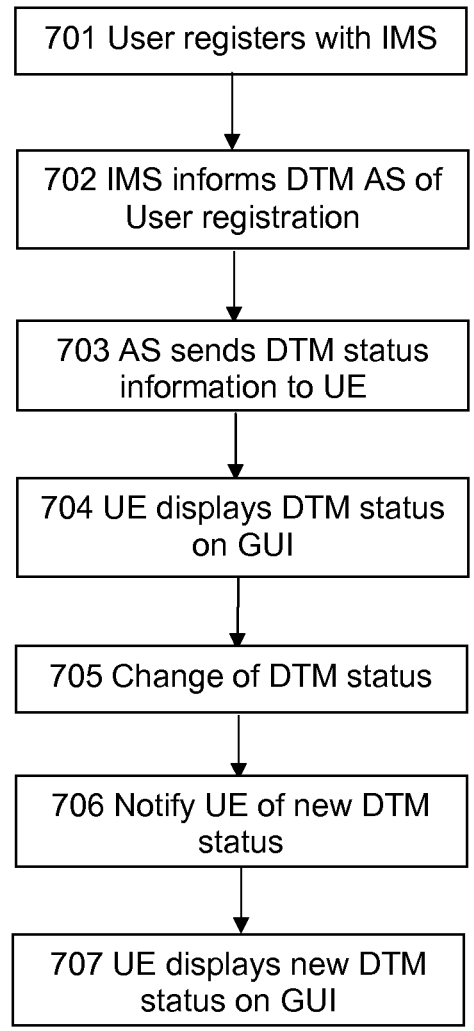
FIG. 7 is a flow diagram showing a sequence of operations for providing dial-tone information to a user terminal.

FIG. 7 is a flow diagram illustrating the principal method steps. At step 701 the User registers with the IMS and at step 702 the IMS informs the dial-tone information management application server (DTM AS) of the user's registration. At step 703 the AS sends the current DTM status information to the UE. This will usually be an indication of a normal dial-tone, but could, for example, indicate a "message waiting" dial-tone. At step 704 the UE displays the current dial-tone (as notified by the AS) on the dial-tone management GUI (DTM GUI). At step 705, a change is made to the DTM status, for example because there is a new voice-mail message or because the User has created or activated a CDIV CFU rule. At step 706 the UE is notified of the new DTM status and at step 707 the UE displays the new DTM status on the DTM GUI.

From the above it will be seen that the dial-tone management information and functionality provided by PES can now be made available for mobile terminal users as well as terminals such as PC clients and PC Soft client terminals, that are not provided with dial tones by the network. Note that although the above-referenced 3GPP CDIV specification 24.604 includes a way for a user to receive a SIP message that includes CDIV status information, this is only provided after an outgoing call has been made, and does not provide the user with a dial-tone status before making a call (which is when the user really needs to know this information).

The invention claimed is:

1. A user terminal configured to access an IMS network, to obtain from the network an indication of a current dial-tone condition of the terminal, wherein said current dial-tone condition is one of a set of dial-tone conditions that includes a special condition dial-tone indicating an active CDIV, Communication Forward Unconditional, CFU, condition, and to display a graphical user-interface, GUI, that includes a visual indication of the current dial-tone condition of the terminal including, when the current dial-tone condition is the special condition dial-tone indicating the active CDIV CFU condition, a visual indication of the active CDIV CFU condition, wherein the user terminal is configured as a client of an Application Server that interacts with the client by means of an interface that allows the client to manipulate dial-tone service-related data associated with the Application Server, and wherein the user terminal is operable to send a request to the network to obtain the indication of the current dial-tone condition of the terminal.

2. The user terminal of claim 1, wherein the set of dial tone conditions also includes a standard dial-tone, and a message-waiting dial-tone.

3. The user terminal of claim 1, wherein the dial-tone condition displayed is determined from dial-tone information provided in a Public Switched Telephone System, PSTN, Emulation Subsystem, PES format.

4. The user terminal of claim 3, wherein the dial-tone information is provided to the user from an application server, AS.

5. The user terminal of claim 4 configured to obtain the dial-tone information from the AS when the user registers with the IMS or when the user creates, or activates a Communication Diversion, CDIV, Communication Forward Unconditional, CFU rule.

6. An Application Server, AS, function in an IMS network configured to provide information to a user terminal accessing the IMS network regarding a current dial-tone condition of the user in response to user registration with the IMS network, in response to creation or activation of a Communication Diversion, CDIV, Communication Forward Unconditional, CFU rule by the user, and in response to deactivation of a CDIV CFU rule by the user, such that the user terminal is able to display an indication of the current dial-tone including, when the CDIV CFU rule has been created or activated, a visual indication of the created or activated CDIV CFU rule, wherein the Application Server is configured to interact with a user terminal configured as a client, and wherein interactions with the client are by means of an interface that allows the client to manipulate dial-tone service-related data associated with the Application Server, and wherein the Application Server is configured to supply the indication of the current dial-tone condition of the terminal in response to a request.

7. The application server of claim 6 configured to determine the dial-tone condition of the user terminal by use of a Public Switched Telephone System, PSTN, Emulation Subsystem, PES.

8. A method of enabling a user of a user terminal accessing an IMS network to be informed of a current dial-tone condition of the user equipment terminal, the method comprising: determining the current dial-tone condition for the user from a set of dial-tone conditions that includes a special dial-tone indicating an active Communication Diversion, CDIV, Communication Forward Unconditional, CFU, condition; providing the user terminal with information regarding the current dial-tone condition; based on the provided information displaying the current dial-tone condition on a graphical user-interface on the user terminal including, when the current dial-tone condition is the special dial-tone indicating the active CDIV CFU condition, displaying a visual indication of the active CDIV CFU condition, configuring the user terminal as a client of an Application Server that interacts with the client by means of an interface; the client using the interface to manipulate dial-tone service-related data associated with the Application Server; and the user terminal sending a request to the network to obtain the indication of the current dial-tone condition of the terminal.

9. The method of claim 8 wherein the dial-tone condition information is provided in a Public Switched Telephone System, PSTN, Emulation Subsystem, PES, format.

10. The method of claim 8, wherein the dial-tone information is provided to the user from an application server, AS.

11. The method of claim 10 wherein the current dial-tone condition information is provided to the user terminal in response to user registration with the IMS network, or in response to creation or activation of a Communication Diversion, CDIV, Communication Forward Unconditional, CFU rule by the user.

12. The method of claim 11 further comprising providing an indication that the current dial-tone condition is normal in response to de-activation of a CDIV CFU rule by the user.

13. The method of claim 8 wherein the set of dial tone conditions also includes one or more of: a standard dial-tone, and a message-waiting dial-tone.

* * * * *

UNITED STATES PATENT AND TRADEMARK OFFICE
CERTIFICATE OF CORRECTION

Page 1 of 1

PATENT NO. : 8,737,271 B2
APPLICATION NO. : 13/322562
DATED : May 27, 2014
INVENTOR(S) : Forsberg It is certified that error appears in the above-identified patent and that said Letters Patent is hereby corrected as shown below:

In the Specification

Column 5, Line 25, delete "User terminal 62" and insert -- User terminal 60 --, therefor.

Signed and Sealed this
Fourth Day of November, 2014

Michelle K. Lee
*Deputy Director of the United States Patent and Trademark Office*